Patented Feb. 24, 1925.

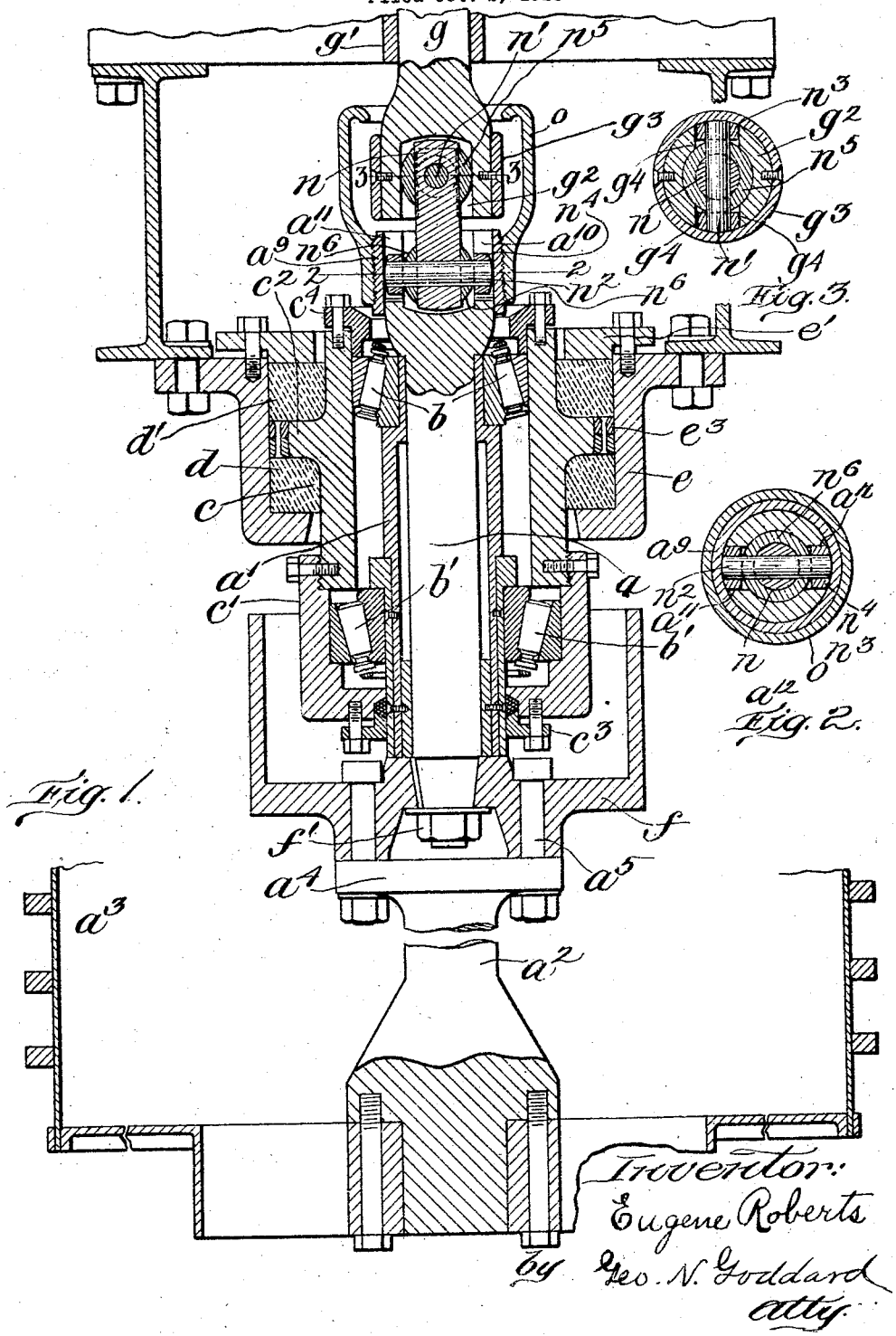

1,527,958

UNITED STATES PATENT OFFICE.

EUGENE ROBERTS, OF SALT LAKE CITY, UTAH, ASSIGNOR TO THE WESTERN STATES MACHINE COMPANY, OF SALT LAKE CITY, UTAH, A CORPORATION OF UTAH.

MEANS FOR MOUNTING AND DRIVING CENTRIFUGAL MACHINES.

Application filed October 2, 1918. Serial No. 256,535.

*To all whom it may concern:*

Be it known that I, EUGENE ROBERTS, citizen of the United States, and resident of Salt Lake City, county of Salt Lake, State of Utah, have invented certain new and useful Improvements in Means for Mounting and Driving Centrifugal Machines, of which the following is a specification.

This invention relates to the mounting and driving of centrifugal machines especially of that type characterized by a gyratory basket-carrying shaft suspended from overhead bearings to permit rotation and gyration, the driving means being directly connected with the upper end of said basket shaft in such a manner as to satisfy the peculiar requirements of heavy centrifugal work such as are met with for example in sugar manufacturing or the like.

The present invention deals with the problem of mounting and driving the rotary gyratory basket shaft from an overhead fixed or non-oscillatory shaft without the transmission of lateral strain to the fixed shaft, and without causing undue vibration or chattering of the shaft bearings which tends to cause the bearings to heat and to deteriorate under continuous service beside involving waste of power.

To this end the invention comprises in combination a suspended gyratory centrifugal basket-carrying shaft mounted in axial alignment with a fixed overhead drive shaft, and an intermediate coupling shaft or transmission link arranged co-axially with the other two shafts and forming a flexible joint connection between them capable of accommodating itself to the sidewise movements of the upper end of the basket shaft away from the central axis. This and other features of the invention such as the construction and arrangement for operatively supporting the basket shaft, the provision for lubrication of the coupling or transmission member and for preventing transmission of lateral strain on the shaft bearings will be hereinafter explained, and will be defined in the claims hereto annexed.

In the accompanying drawings I have shown so much of the centrifugal and its mount in connection with the fixed drive shaft as is requisite for an understanding of the principle of the invention and a convenient and practical embodiment thereof in which —

Figure 1 is a vertical central section showing the means for mounting and driving the centrifugal, a part of the lower portion of the basket shaft and basket being broken away;

Figure 2 is a transverse section through the lower pivotal center of the transmission member on plane 2—2 of Figure 1;

Figure 3 is a similar section through the upper center of the transmission member.

In the practice of the invention according to the specific form illustrated in the drawings, I make the basket-supporting shaft in three separable parts or sections comprising the upper shaft member $a$. A surrounding sleeve $a'$ is firmly secured thereon and held in place by the supporting brake-band member $f$ which is fastened to the lower end of the shaft section $a$ by means of the clamping nut $f'$. The lower or basket section $a^2$ of the centrifugal shaft is firmly bolted to the intermediate brake-band member $f$ by means of the bolts $a^5$ passed through the horizontal flange $a^4$ at the upper end of the shaft section $a^2$.

The upper shaft element comprising the solid spindle $a$ and sleeve $a'$ are rotatably mounted in roller bearings $b$, $b'$, the rollers being tapered and being supported in suitable race members to sustain the axial or vertical thrust of the centrifugal shaft both upwardly and downwardly so that it is impossible for the centrifugal shaft to lift from its bearings under the stress of sidewise shocks or strains when rotating at high speed and oscillating under the influence of an unbalanced load. The roller bearings also support firmly the lateral stress or thrust of the centrifugal shaft to permit easy rotation.

These rotary shaft bearings are firmly mounted inside a hollow bearing head $c$ which preferably, as shown in the drawings, is made in two sections, the upper section $c$ being provided with a laterally projecting annular flange $c^2$ by which the head is yieldingly supported between lower and upper elastic annular buffers $d$, $d'$. The lower bearing head member $c'$ is screwed over the outside of the lower end of the upper member $c$ and is held firmly against circumferential displacement thereon by means of small bolts or pins. As the centrifugal shaft bearings are intended to be immersed in oil, a packing gland ring $c^3$ is provided at the lower end of the bearing head member $c'$ to prevent the leakage of oil between the head and the rotary shaft. The brake-pulley $f$ is of cup shape so as to extend up around this lower bearing in order to catch any drip in case there should be leakage of oil.

The bearing head $c$ is mounted in the fixed hanger $e$ so as to provide a universal joint to permit oscillation of the bearing head in all directions. To prevent lateral and axial displacement of the bearing head under the service stresses, the exterior face of the annular flange $c^2$ is convexly curved and a bearing ring $e^3$ is fitted snugly between the exterior of said flange and the interior vertical wall of the hanger $e$. This centralizing ring $e^3$ for convenience in assembling is made in upper and lower sections fastened together after being assembled in operative position on the flange $c^2$, and supported in place by the yielding buffers $d$, $d'$. A buffer clamping ring $e'$ is secured to the top of the hanger $e$ by means of bolts so that the buffers may be firmly compressed and held in proper operative position.

The centrifugal is rotated by means of the fixed or non-oscillatory shaft $g$ which is rotated by any suitable driving means and which is mounted in fixed bearings $g'$. It is important that the means for transmitting rotation from the drive shaft $g$ to the centrifugal shaft should be of such a nature as to transmit the power with the minimum of friction or loss and especially to avoid subjecting the fixed drive shaft $g$ to any lateral strains due to the oscillation or sidewise movement of the upper end of the centrifugal or basket shaft.

To effect this purpose the adjacent ends of the two aligned shafts are centrally bored to form retaining guide sockets for the connecting or transmission member, thus leaving the upper shaft with an annular downwardly projecting flange $g^2$, and the centrifugal shaft with an upwardly projecting annular flange $a^{10}$. These two co-axial flanges are cut through at diametrically opposite points, the cuts or notches $a^{11}$ of the basket shaft being arranged at an angle of 90° to the corresponding cuts or notches $g^4$ in the drive shaft.

A connecting link or short transmission shaft $n$ is mounted in axial alignment with the shaft $g$ and the shaft $a$, and is provided at its opposite ends with exterior guide or bearing balls $n^5$, $n^6$ which fit snugly inside the respective recesses or sockets formed in the shafts $g$ and $a$ respectively so as to prevent lateral play or movement of the transmission member. Transverse pins $n'$, $n^2$ which are preferably provided with rollers or wear-rings $n^3$, $n^4$ fit snugly into the vertical notches or cuts of the flanges $g^2$, $a^{10}$ which are passed directly through the transmission member or shaft $n$ at right angles to each other and through the centers of the respective guide balls so as to form pivotal driving pins for transmitting the torque of the drive shaft to the centrifugal. The outer faces of these wear-rings and of the pins are convexly curved to fit inside a surrounding band or collar $g^3$ on the drive shaft and a similar collar $a^9$ around the basket shaft to keep the pins centralized.

In order to provide adequate lubrication for the pivotal joint of the connecting or transmission link, I provide an oil cup $o$ which is carried by the upper end of the basket shaft and extends upwardly overlapping the lower end of the drive shaft sufficiently to inclose the upper flexible joint so that both joints may be kept immersed in lubricant.

It is to be noted that the transmission member with its two torque pins is really a floating member, one or both joint connections with the coupled shafts having vertical play or movement as well as a universal joint movement so that the connecting member is free to accommodate itself to the shifting positions of the upper end of the basket shaft due to its oscillation. By reason of the fact that both joints of the connecting member are universal joints, at least one of them having such sliding movement with relation to its shaft, it will be obvious that the lateral movement of the basket shaft does not impose any sidewise thrust or strain upon the drive shaft or its portions, consequently, all chattering or heating of the bearings is avoided.

It will be observed that by the above-described arrangement for mounting and supporting the basket shaft not only is the basket shaft itself held by its bearings against any axial movement in either direction up or down, but also that the gyratory suspension member or head in which the rotary bearings are located is itself held both against lateral displacement and against vertical or axial displacement thereby overcoming any tendency of either the shaft or the hollow suspension member from lifting under the shock imparted by the lateral swing of the heavy basket carried at the lower end of the shaft. This is of much importance in securing the smooth running of the machine however driven.

It will be clear that so long as the retaining ring $c^3$ is held against moving up or down, that is, axial of the shaft, the suspension member or head $c$ can not be displaced vertically or axially since the concavo-convex or spherical ball and socket engagement between the parts of the retaining ring above and below the equatorial plane of the center of oscillation will positively prevent such displacement.

That the spherically curved retaining ring can not move up or down but is firmly held against such movement will be apparent from consideration of the fact that when one side of the spherically curved flange or bearing member of the head lifts against and compresses the superimposed buffer, relieving some of its downward pressure on the ring, the opposite side of the same buffer is correspondingly compressed. Now as the ring $c^3$ can not tilt because of its exterior cylindrical engagement with the surrounding wall of the hanger it can neither rise nor fall because the lessening of pressure against its top face on one side is counterbalanced by a corresponding increase in the downward pressure on the opposite side of the center. Hence, oscillation of the overhead suspension member and of the suspended centrifugal takes place about a positively fixed or non-shifting center as the oscillatory suspension member can not lift out of its spherically curved socket ring forming its bearing seat. In consequence there is an entire absence of hammering or pounding on any of the supporting bearings and a very smooth running action is obtained.

I believe that I am the first in the art to provide a construction and arrangement for rotatably suspending a centrifugal from its overhead hanger so as to gyrate about a positively fixed center against a yielding centralizing resistance, while positively held against axial movement in either direction. This is a principle of construction which is of great practical importance in preventing vibration and hammering of the supporting bearings and greatly prolongs the life and serviceability of the bearings and insures smooth and easy operation of the machine.

What I claim is:

1. In a drive for centrifugal machines the combination of a drive shaft rotatable about a fixed vertical axis, a gyratory-basket-carrying shaft rotatably suspended at its upper end on an oscillatory bearing member in axial alignment with said drive shaft, an interconnecting transmission shaft forming a positive driving coupling between the adjacent ends of the aforesaid shafts and having flexible joint driving connection with each of said shafts and being free to accommodate itself to the lateral movements of the basket shaft while transmitting rotary motion thereto, substantially as described.

2. In a centrifugal machine drive the combination of an overhead drive shaft rotatable about a fixed axis, a gyratory basket-carrying shaft suspended at its upper end on rotary bearings to permit rotation and oscillation, a connecting shaft supported by the aforesaid shafts through flexible joint connections therewith to form a coupling for transmitting rotation to the gyratory basket shaft, said connecting shaft having vertical play with relation to one of the shafts which it connects in order to permit sidewise movement of the basket shaft away from the central vertical axis, substantially as described.

3. In a drive for centrifugal machines the combination of a gyratory basket-carrying shaft suspended at its upper end on rotary bearings, an overhead drive shaft rotatably mounted in fixed bearings, a coaxial connecting member having at its upper end a universal joint driving connection with the drive shaft, and at its lower end a universal joint connection with the gyratory basket shaft, one of said connections permitting vertical play of said connecting member in order to permit the sidewise oscillation of the basket shaft without permitting side strain upon the drive shaft, substantially as described.

4. In a drive for centrifugal machines the combination with a gyratory basket-carrying shaft suspended on rotary bearings, an overhead vertically aligned drive shaft mounted to rotate in fixed bearings, each of said shafts being provided at their adjacent ends with central sockets whose surrounding walls are provided with diametrically opposed pin-engaging recesses, horizontal torque transmitting pins arranged at right angles to each other and engaged in the respective recesses, and a connecting member in which said pins are mounted and acting to transmit the torque from the overhead shaft to the basket shaft, substantially as described.

5. In a centrifugal machine drive the combination of the gyratory basket-carrying shaft suspended on rotary bearings, carried by an oscillatory head, an overhead vertically aligned drive shaft rotatable about a fixed axis, a coupling shaft interconnecting the adjacent ends of the two shafts aforesaid and having universal joint connection with each shaft, and means for maintaining lubrication of both said joints, substantially as described.

6. The combination of a fixed socketed hanger, a bearing head mounted to oscillate in said hanger, yielding buffers arranged to limit the oscillation of said bearing head, a basket-carrying shaft supported in rotary bearings carried by said bearing head, said rotary bearings comprising two sets of antifriction rollers oppositely tapered to sustain the end thrust of the basket shaft in both directions, an overhead drive shaft vertically aligned with the basket shaft, and a transmission coupling member having universal joint connection with the basket shaft and the overhead shaft in order to transmit rotation while permitting gyration of the basket shaft, substantially as described.

7. In a centrifugal machine the combination of a fixed socketed hanger, a bearing head supported inside said hanger to permit oscillation, said bearing head being provided with an exterior flange supported between upper and lower elastic buffers, and a centralizing guide ring forming a spherical bearing member between the wall of said hanger and the curved exterior face of said flange, a plurality of anti-friction bearings mounted in said bearing head, and a gyratory basket-carrying shaft rotatably suspended on said bearings, substantially as described.

8. In a centrifugal machine the combination of a socketed hanger, a gyratory bearing head provided with an external supporting flange, upper and lower yielding buffers engaging said flange to support the bearing head for oscillation while opposing a yielding resistance to such oscillation, a centralizing guide member interposed between the exterior face of said flange and said hanger, means for compressing said buffers against the bearing head and the supporting hanger, and a gyratory basket shaft rotatably suspended inside said bearing head, substantially as described.

9. In a centrifugal machine, the combination of a fixed overhead hanger, a centralizing buffer, a gyratory non-rotative suspension member having spherical bearing engagement with the fixed hanger affording support for the gyratory suspension member against lateral and axial displacement in either direction while permitting its gyration against the yielding centralizing buffer, a rotary basket shaft and rotary anti-friction bearings interposed between said suspension member and said shaft in position to sustain axial thrusts of the shaft in both directions whereby the gyration of the centrifugal about a fixed center without lifting is secured, substantially as described.

10. In a centrifugal machine the combination of a fixed hanger, a bearing head supported therein on a universal joint to permit oscillation, a centralizing member interposed between the exterior surface of said bearing head and the socketed hanger to prevent lateral displacement of the bearing head, a basket-carrying shaft rotatably supported in said bearing head to oscillate in unison therewith, an overhead drive shaft vertically aligned with the central axis of said basket shaft, and a flexible joint coupling member interconnecting the overhead drive shaft and the basket shaft, substantially as described.

11. The combination of a gyratory centifugal basket carrying shaft suspended on an oscillatory rotary bearing, an overhead drive shaft vertically aligned with the central axis of said basket shaft mounted to rotate about a fixed axis, a coupling member and a universal joint connection between both of said shafts, and an oil cup secured to the basket shaft and extending upwardly above the level of the universal joint connection with the drive shaft, substantially as described.

12. In a drive for centrifugal machines the combination of a gyratory basket-carrying shaft rotatably suspended from an oscillatory bearing head, an overhead drive shaft vertically aligned with the central axis of said basket shaft to rotate about a fixed axis, an interconnecting coupling shaft connected at its upper end with the drive shaft about a horizontal pivotal axis, and having connection at its lower end with said gyratory basket shaft about a horizontal axis at right angles to the aforesaid upper pivotal axis, substantially as described.

13. In a centrifugal machine drive the combination of three vertically aligned rotary shafts, the lowermost of which is a gyratory basket-carrying shaft, the uppermost shaft being a non-gyratory driving shaft, and the intermediate shaft being supported by the adjacent ends of the upper and lower shafts and having a jointed driving engagement with each of them for transmitting rotation from the power shaft to the basket shaft, substantially as described.

14. In a centrifugal machine drive the combination of a bearing head, means for supporting said bearing head to permit gyration against a yielding resistance, a rotary basket-carrying shaft rotatably mounted in said bearing head, an overhead drive shaft rotating in fixed bearings with its axis aligned with the vertical axis of said basket shaft, a short intermediate shaft having universal joint engagement with the adjacent ends of the other two shafts and having vertical play with relation to one of said shafts whereby rotation is transmitted from the drive shaft to the basket shaft without transmission of lateral strain, substantially as described.

15. In a centrifugal machine drive the combination of a fixed hanger, a hollow bearing head yieldingly mounted in said hanger to oscillate about a predetermined center and having an annular external bearing surface in the plane of its center of oscillation to prevent lateral displacement while permitting oscillation, a basket-carrying shaft rotatably suspended in said bearing member and an overhead vertically aligned non-oscillatory driving shaft, and means for flexibly connecting said driving shaft with the upper end of said basket shaft to transmit rotation from the driving shaft to the basket shaft, substantially as described.

16. In a gyratory centrifugal machine, the combination of a fixed overhead suspension hanger, a centralizing buffer, a non-rotating gyratory suspension member mounted therein on a ball and socket joint to gyrate against said centralizing buffer while positively held against lifting by said ball and socket joint, a rotary basket-suspending shaft, upper and lower anti-friction bearing elements arranged to afford rotative lateral support between the shaft and its suspension member and to prevent axial movement of the shaft in either direction whereby gyration of the rotating centrifugal about a fixed center without lifting is secured, substantially as described.

17. In a centrifugal machine, the combination with an overhead hanger, of a gyratory suspension member provided with a spherically curved bearing portion seated in a spherically curved socket member having engagement therewith to prevent the lifting of the suspension member in said hanger while permitting it to oscillate, a centralizing buffer for resisting said oscillation, a rotary basket-carrying shaft, upper and lower anti-friction bearing elements carried by and gyrating with said suspension member, said bearings being arranged to receive axial thrust of the shaft in either direction while affording radial bearing support for the rotary shaft whereby gyration of the basket shaft about a fixed constant center is secured, substantially as described.

In witness whereof I have subscribed the above specification.

EUGENE ROBERTS.